United States Patent
Shlomov et al.

(10) Patent No.: US 12,417,351 B2
(45) Date of Patent: Sep. 16, 2025

(54) ROBOTIC PROCESS AUTOMATION USING GENERATED SEMANTIC INFORMATION

(71) Applicant: International Business Machines Corporation, Armonk, NY (US)

(72) Inventors: Segev Shlomov, Haifa (IL); Avi Yaeli, Ramot Menashe (IL); Sami Marreed, Kafer Kanna (IL); Raphaël Canyasse, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 18/302,221

(22) Filed: Apr. 18, 2023

(65) Prior Publication Data
US 2024/0354510 A1   Oct. 24, 2024

(51) Int. Cl.
*G06F 40/30* (2020.01)
*G06F 9/455* (2018.01)

(52) U.S. Cl.
CPC .......... *G06F 40/30* (2020.01); *G06F 9/45512* (2013.01)

(58) Field of Classification Search
CPC .............................. G06F 9/45512; G06F 40/30
See application file for complete search history.

(56) References Cited

U.S. PATENT DOCUMENTS

| | | | | |
|---|---|---|---|---|
| 8,949,242 B1 * | 2/2015 | Lin | ........................ | G06F 16/36 707/739 |
| 11,176,443 B1 | 11/2021 | Selva et al. | | |
| 12,147,881 B2 * | 11/2024 | Dines | .................... | G06F 40/216 |
| 2012/0203880 A1 * | 8/2012 | Kluyt | ........................ | G06F 9/54 709/223 |
| 2013/0263091 A1 * | 10/2013 | Neogi | .................. | G06F 11/3668 717/126 |
| 2020/0073686 A1 * | 3/2020 | Hanke | ...................... | G06F 18/22 |
| 2020/0111023 A1 * | 4/2020 | Pondicherry Murugappan ........... G06N 5/02 | | |
| 2020/0258106 A1 * | 8/2020 | Roy | ......................... | G06F 40/40 |
| 2020/0401431 A1 * | 12/2020 | Rashid | ................ | G06F 9/45512 |

(Continued)

FOREIGN PATENT DOCUMENTS

WO      2024/218601 A1     10/2024

OTHER PUBLICATIONS

International Searching Authority, "Notification of Transmittal of the International Search Report and the Written Opinion of the International Searching Authority, or Declaration," Patent Cooperation Treaty, Date—Jul. 15, 2024, 11 pages, International Application No. PCT/IB2024/053215.

(Continued)

*Primary Examiner* — Eric Yen
(74) *Attorney, Agent, or Firm* — Kimberly Zillig

(57) ABSTRACT

An example system includes a processor to detect a non-found element from a robotic process automation (RPA) script executed on an application. The processor can analyze the application to extract a group and a set of elements from the application. The processor can calculate a semantic similarity between the extracted group and a previously extracted group from a previous version of the application. The processor can calculate, in response to detecting that the extracted group is similar to the previously extracted group, a semantic similarity between the extracted set of elements and the non-found element. The processor can re-direct the RPA script to use a most similar element of the extracted set of elements.

25 Claims, 9 Drawing Sheets

(56) References Cited

U.S. PATENT DOCUMENTS

| | | | |
|---|---|---|---|
| 2021/0122051 A1* | 4/2021 | An | G06F 11/3013 |
| 2021/0286782 A1* | 9/2021 | Obinata | G06F 16/29 |
| 2022/0093088 A1* | 3/2022 | Rangarajan Sridhar | |
| | | | G06F 16/338 |
| 2022/0114044 A1 | 4/2022 | Singh | |
| 2023/0107316 A1* | 4/2023 | Ripa | G06V 30/10 |
| | | | 700/29 |
| 2024/0362328 A1* | 10/2024 | Chung | G06F 21/565 |

OTHER PUBLICATIONS

Anonymous, "Self-healing RPA for Quality Engineering", State of AI applied to Quality Engineering 2021-22, Nov. 18, 2020, 13 pages.

Anonymous, "Semantic Automation: old wine in a new bottle or the next big thing?", Jun. 19, 2022, 10 pages.

Jun-Wei Lin et al., "Using Semantic Similarity in Crawling-based Web Application Testing" 2017 IEEE International Conference on Software Testing, Verification and Validation (ICST), May 18, 2017, 11 pages.

Sacha Brisset et al., "ERRATUM: Leveraging Flexible Tree Matching to Repair Broken Locators in Web Automation Scripts", Information and Software Technology, Jun. 9, 2021, 34 pages.

Shannon, Doug, "The subtle art of self-healing automation and discovery in RPA", Published in LinkedIn, Nov. 28, 2020, 9 pages.

"Getting started with schema.org using Microdata" online available at: https://schema.org/docs/gs.html, Jun. 6, 2011, 9 pages.

Goncalves , et al., "A Similarity Search Method For Web Forms" available online at: https://www.researchgate.net/publication/290913448_A_similarity_search_method_for_Web_forms, Jan. 2011, 8 pages.

Rahm, et al., "A Survey of Approaches to Automatic Schema Matching" The VLDB Journal, vol. 10, Issue 4, Dec. 2001, pp. 334-350.

Zeeshanuddin, S., "A Library of Schema Matching Algorithms for Dataspace Management Systems" online available at: https://studentnet.cs.manchester.ac.uk/resources/library/thesis_abstracts/MSc11/FullText/SyedZeeshanuddin-fulltext.pdf, 2011, 105 pages.

\* cited by examiner

Add new employee details — 602A

- First Name | Last Name | Username
- Mark | Otto | @ Username
- City | State | Zip
- City | State | Zip — 604
- Role in company | Band — 604
- Select Item | e.g. 7 — 604, 606
- ☐ I approve that the data is correct
- Submit form

Employee details — 602B

- First Name | Last Name | User ID
- Mark | Otto | User ID
- Job Description | Level — 604
- Select Item | e.g. 7 — 604, 606
- City | City — 604
- State | State | Zip | Zip — 604
- ☐ I agree that I entered the information correctly
- Add

Request Employee removal for IT — 602C

- User ID — 604
- Mark — 604
- Send request — 604

600B
FIG. 6B

ROBOTIC PROCESS AUTOMATION USING GENERATED SEMANTIC INFORMATION

BACKGROUND

The present techniques relate to robotic process automation (RPA). More specifically, the techniques relate to maintaining resiliency of RPA systems.

RPA bots consist of a sequence of actions that are performed automatically by a bot. For example, an RPA bot may go over a list of candidates, and check if the candidates appear in an internal candidate system. If not, then the RPA bot may add them to the system. If yes, then the RPA bot may check if email or phone needs to be updated.

When constructing an RPA bot on the web, developers may record interactions with applications and objects such as clicking on a button or typing some text in an input. For example, these interactions may be recorded in a script that contains instructions that can be later performed by an RPA bot. The instructions codify which application to use, how to locate an object in the application, and what interaction or event is to be simulated by the bot. For example, in web applications, a script may include the application uniform resource locator (URL), Extensible Markup Language (XML) Path Language (Xpath), or cascading style sheet (CSS) selectors to locate the object in the DOM structure, and the event to generate on that object. However, this type of selector strategy may not be reliable. For example, with the evolution of an application and its versions, a selector that depends on some element metadata (id, class, etc.) of the application may change. The RPA bot may thus fail in locating the object during execution time.

To address this issue, some methods apply heuristics to find objects during execution time. For example, one example heuristic is a fuzzy selector that enable locating strings based on a pattern, rather than on an exact match. For example, at attribute "username" may have changed to "uname" and thus be located using a fuzzy selector. In some cases, the anchoring of base object reference may also be used in which the anchoring may involve referring to an object by its surrounding element. For example, the label of an input. These methods provide hints to relocate the object even when the metadata of the object changes but assume that the label does not. In some cases, a basic syntactic textual analysis may be performed to cope with minor label changes. For example, a label may be slightly renamed from "owner" to "owners". However, the techniques in the state of the art have various limitations. For example, the techniques may not be able to re-locate previous elements with name changes that are semantically similar, or may mismatch previous elements with elements having names or labels using very similar language but corresponding to different functionality in the updated application. For example, a "submit form" button may be replaced with another button in an updated application, but the updated application may have both an "add" button and a "send request" button. The techniques above may not be able to determine which of the buttons is to be used as a replacement button.

SUMMARY

According to an embodiment described herein, a system can include processor to detect a non-found element from a robotic process automation (RPA) script executed on an application. The processor can also further analyze the application to extract a group and a set of elements from the application. The processor can also calculate a semantic similarity between the extracted group and a previously extracted group from a previous version of the application. The processor can calculate, in response to detecting that the extracted group is similar to the previously extracted group, a semantic similarity between the extracted set of elements and the non-found element. The processor can then re-direct the RPA script to use a most similar element of the extracted set of elements. Thus, the system enables a more resilient RPA that can automatically self-heal. Optionally, the group includes a visual group. In this embodiment, the system can use visual elements for automatic self-healing. Optionally, the group includes a structural group. In this embodiment, the system can use visual elements for automatic self-healing. Optionally, the group includes a predefined default group. In this embodiment, the predefined default group can be used when a group is otherwise not detectable such as where no form is detected. Optionally, the group includes a non-form element. In this embodiment, the non-form elements such as div tags can be used for semantic grouping. Preferably, the group is hierarchical. In this embodiment, higher levels of the hierarchy can be used to efficiently determine a replacement element for a non-found element. Optionally, the group is part of a hierarchy of groups that is nested. In this embodiment, the group hierarchy may be other than a simple parent-child relationship, such as any number of groups within other groups. Optionally, the element includes an input. In this embodiment, non-found inputs can be automatically re-directed to new inputs. Optionally, the element includes a tag. In this embodiment, non-found tags can be automatically re-directed to new tags. Optionally, the element includes a micro-tag. In this embodiment, micro-tag elements can be automatically re-directed to new elements. Optionally, the application includes a web application, and wherein the semantic groups include HTML forms and the elements include HTML inputs. In this embodiment, non-found elements of web applications can be automatically re-directed to new elements for RPA scripts. Optionally, the application includes a program to run, and object references use windows, and controls. In this embodiment, an element of an updated instance of a program can be automatically re-directed to a new element for the RPA script.

According to another embodiment described herein, a method can include detecting, via a processor, a non-found element from a robotic process automation (RPA) script executed on an application. The method can further include analyzing, via the processor, the application to extract a group and a set of elements from the application. The method can also further include calculating, via the processor, a semantic similarity between the extracted group and a previously extracted group from a previous version of the application. The method can also include calculating, via the processor, in response to detecting that the extracted group is similar to the previously extracted group, a semantic similarity between the extracted set of elements and the non-found element. The method can include re-directing, via the processor, the RPA script to use a most similar element of the extracted set of elements. Thus, the method enables a more resilient RPA that can automatically self-heal. Optionally, the method includes using computer vision techniques to identify and extract the groups and the elements. In this embodiment, non-textual data can be processed. Preferably, calculating the semantic similarities includes calculating a cosine similarity score. In this embodiment, semantic similarity can be efficiently calculated between extracted elements and groups. Optionally, detecting that groups are similar and elements are similar includes determining that the similarity scores between the groups and elements exceed a similarity threshold. In this embodiment, the use of a threshold enables an automatic re-direction of non-found elements to new elements. Optionally, detecting that groups are similar and elements are similar includes sending the similarity scores for review in response to detecting that the scores do not exceed the similarity threshold and are within a range of the similarity threshold, and receiving an approval that the groups or elements are similar. In this embodiment, elements that are not similar enough to be automatically re-directed, but still somewhat similar, can also be used with the approval. Optionally, analyzing the application includes extracting a number of groups from the application, and the method further includes calculating the semantic similarity between the extracted number of groups and the previously extracted group from the previous version of the application, and selecting a most similar group with a higher similarity score as a target group. In this embodiment, the target group can be used to efficiently detect a replacement element towards which to re-direct the non-found element. Preferably, the method also includes generating, via the processor, semantic information for the previous version of the application at a recording time of the RPA script. In this embodiment, the semantic information from the previous version can be used to efficiently detect a replacement element for the non-found element. Preferably, the method includes updating the RPA script with the most similar element. In this embodiment, the non-found element is thus re-directed to the most similar element in future executions of the RPA script without an additional self-healing.

According to another embodiment described herein, a computer program product for robotic process automation can include computer-readable storage medium having program code embodied therewith. The program code executable by a processor to cause the processor to detect a non-found element from a robotic process automation (RPA) script executed on an application. The program code can also cause the processor to analyze the application to extract a group and a set of elements from the application. The program code can also cause the processor to calculate a semantic similarity between the extracted group and a previously extracted group from a previous version of the application. The program code can also cause the processor to calculate, in response to detecting that the extracted group is similar to the previously extracted group, a semantic similarity between the extracted set of elements and the non-found element. The program code can also cause the processor to re-direct the RPA script to use a most similar element of the extracted set of elements. Thus, the computer program product enables more resilient RPA that can automatically self-heal. Preferably, the program code can also cause the processor to also further calculate a cosine similarity score. In this embodiment, semantic similarity can be efficiently calculated between extracted elements and groups. Optionally, the program code can also cause the processor to detect that the similarity scores between the groups and elements exceed a similarity threshold. In this embodiment, the use of a threshold enables an automatic re-direction of non-found elements to new elements. Optionally, the program code can also cause the processor to extract a number of groups from the application, calculate the semantic similarity between the extracted number of groups and the previously extracted group from the previous version of the application, and select a most similar group with a higher similarity score as a target group. In this embodiment, the target group can be used to efficiently detect a replacement element towards which to re-direct the non-found element. Preferably, the program code can also cause the processor to generate semantic information for the previous version of the application at a recording time of the RPA script. In this embodiment, semantic information from the previous version can be used to efficiently detect a replacement element for the non-found element.

BRIEF DESCRIPTION OF THE SEVERAL VIEWS OF THE DRAWINGS

FIG. 6A is an example first version of an HTML page that may have semantic information extracted via a semantic analysis performed at a recording time;

FIG. 6B is an example updated version of an HTML page that may have a resilient RPA applied at execution using semantic information extracted from the first version;

DETAILED DESCRIPTION

Figure 1:
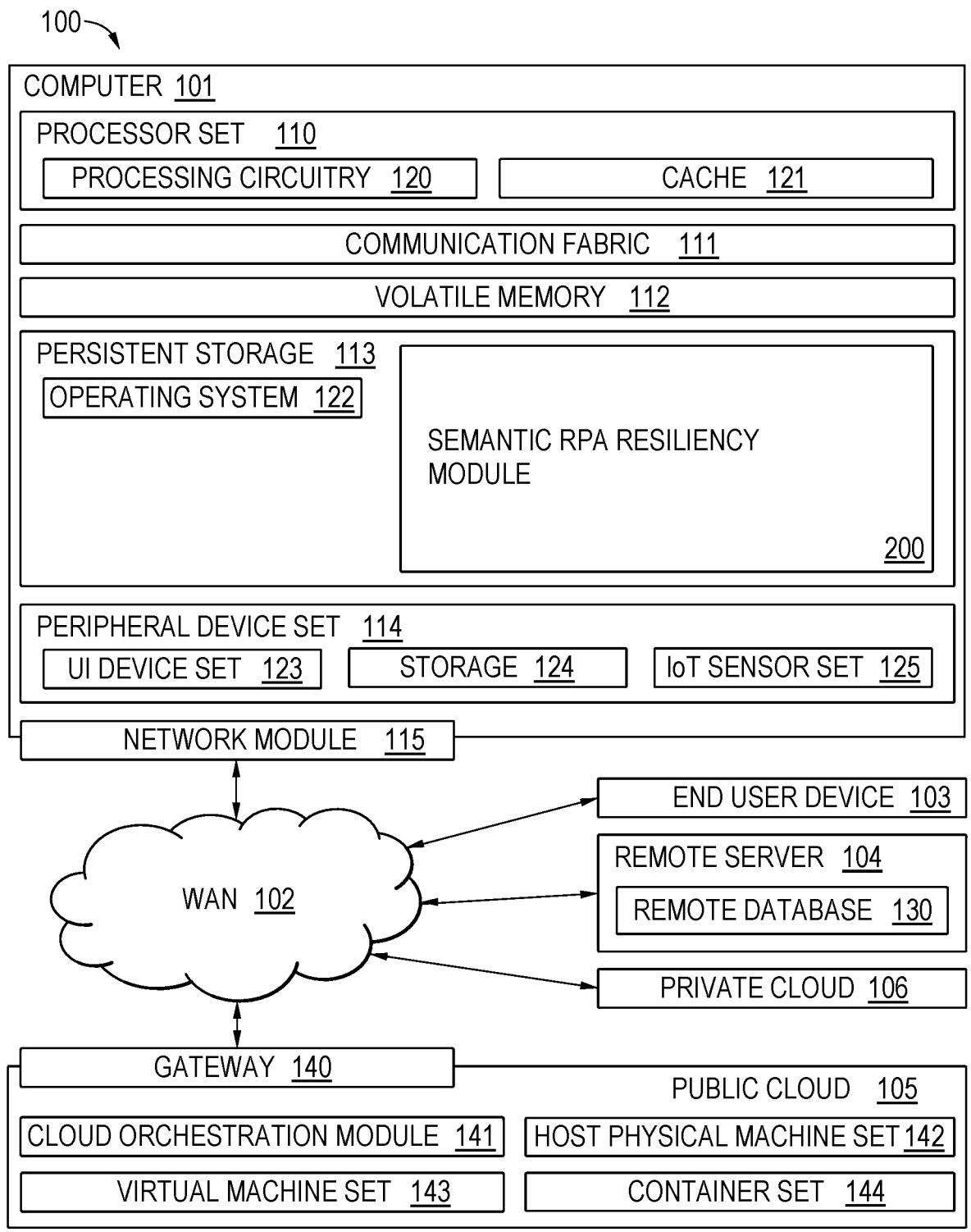
FIG. 1 is a block diagram of an example computing environment that contains an example of an environment for the execution of at least some of the computer code involved in performing the inventive methods, such as a semantic robotic process automation (RPA) resiliency module.

According to embodiments of the present disclosure, an RPA bot performs some tasks. At some point, the RPA bot may fail. For example, the RPA bot may fail because a particular element cannot be found in the current HTML application and page. The embodiments herein thus include two parts executed at a recording time of the RPA bot and a at the playing/running time. In the first part, the embodiments collect additional meta-data on the element and its corresponding semantic group details. For example, elements may be divided into semantic groups using div tags, forms, etc. In the second part, the embodiments find the most similar parent element in the semantic group and thereafter compute the most similar element inside the parent group. As one example, an example system includes a processor that can detect a non-found element from a robotic process automation (RPA) script executed on an application. The processor can analyze the application to extract a group and a set of elements from the application. The processor can calculate a semantic similarity between the extracted group and a previously extracted group from a previous version of the application. The processor can calculate, in response to detecting that the extracted group is similar to the previously extracted group, a semantic similarity between the extracted set of elements and the non-found element. The processor can re-direct the RPA script to use a most similar element of the extracted set of elements. Thus, embodiments of the present disclosure improving RPA bot resiliency by applying semantic understanding of application group hierarchies, and a self-healing algorithm that is able to rediscover not-found elements. In particular, the embodiments herein improve RPA bot resiliency by applying an approach that includes a semantic understanding of application group hierarchies, automatic detection of textual representations and metadata of elements, and a self-healing algorithm that is able to rediscover the elements given application changes that are semantically equivalent to the application at record time. Moreover, the embodiments applicable to any type of application and grouping strategy. For simplicity of the explanation, the embodiments are described for the particular example of HTML forms and their inputs. However, the embodiments cover additional situations and non-web-based applications. In particular, the embodiments herein were experimented on several use-cases, and the embodiments described herein achieved a much higher resiliency than current available solutions in RPA. Moreover, the embodiments described herein do not require a bot developer to solve the problem, but rather automatically fix the RPA bot. This is extremely useful, particularly in cases where HTML pages change frequently.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a semantic RPA resiliency module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
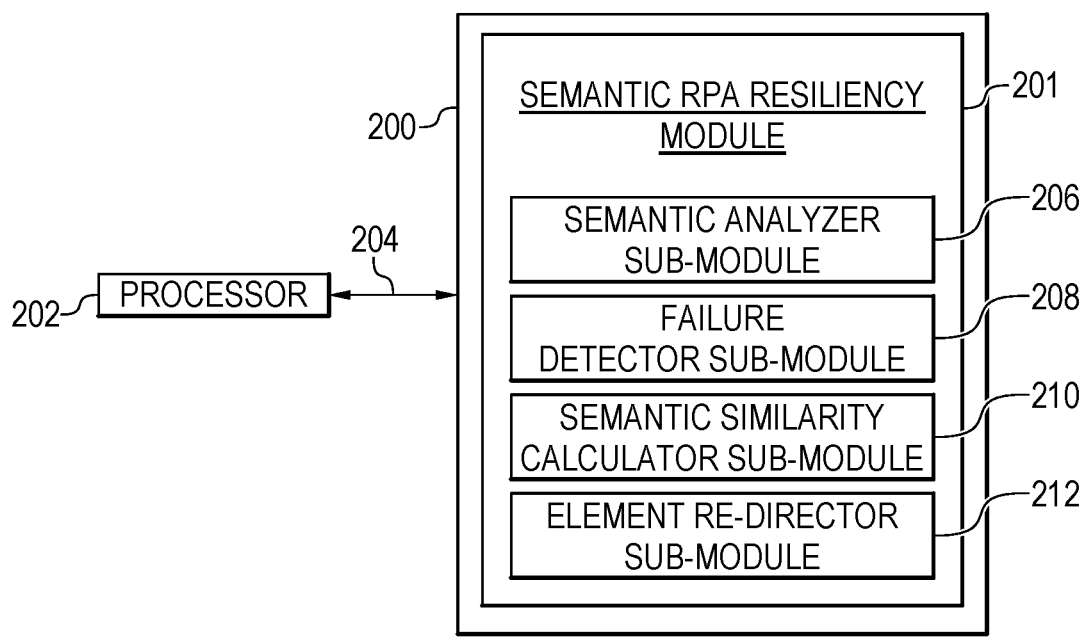
FIG. 2 is an example tangible, non-transitory computer-readable medium that can execute a resilient RPA using generated semantic information.

Referring now to FIG. 2, a block diagram is depicted of an example tangible, non-transitory computer-readable medium 201 that can execute a resilient RPA using generated semantic information. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the methods 300, 400A, and 400B of FIGS. 3, 4A, and 4B.

The various software components discussed herein may be stored on the tangible, non-transitory, computer-readable medium 201, as indicated in FIG. 2. For example, the semantic RPA resiliency module 200 includes a semantic analyzer sub-module 206 that includes code to analyze an application to extract a group and a set of elements from the application. The semantic analyzer sub-module 206 also includes code to extract a number of groups from the application. In some examples, the semantic analyzer sub-module 206 includes code to generate semantic information for the previous version of the application at a recording time of an RPA script. The semantic RPA resiliency module 200 also includes a failure detector sub-module 208 includes code to detect a non-found element from a robotic process automation (RPA) script executed on an application. The semantic RPA resiliency module 200 also includes a semantic similarity calculator sub-module 210 includes code to calculate a semantic similarity between the extracted group and a previously extracted group from a previous version of the application. The semantic similarity calculator sub-module 210 also includes code to calculate, in response to detecting that the extracted group is similar to the previously extracted group, a semantic similarity between the extracted set of elements and the non-found element. In various examples, the semantic similarity calculator sub-module 210 includes code to detect that the similarity scores between the groups and elements exceed a similarity threshold In some examples, the semantic similarity calculator sub-module 210 includes code to calculate the semantic similarity between an extracted number of groups and the previously extracted group from the previous version of the application, and select a most similar group with a higher similarity score as a target group. The semantic RPA resiliency module 200 also includes an element re-director sub-module 212 to re-direct the RPA script to use a most similar element of the extracted set of elements. In some examples, the element re-director sub-module 212 includes code to update the RPA script with the most similar element.

Figure 3:
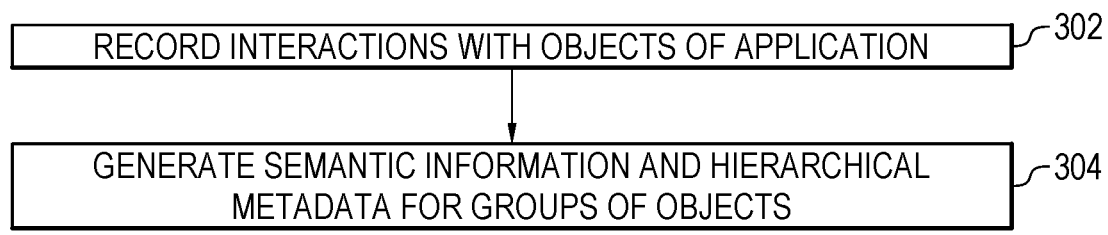
FIG. 3 is a process flow diagram of an example method that can generate semantic information for use in execution of a resilient RPA.

FIG. 3 is a process flow diagram of an example method that can generate semantic information for use in execution of a resilient RPA. The method 300 can be implemented with any suitable computing device, such as the computer 101 of FIG. 1. For example, the methods described below can be implemented by the processor set 110 of FIG. 1.

At block 302, interactions with objects of an application are recorded. For example, the application may be a web application and the objects may include groups and elements corresponding to web pages, forms, and inputs, among other objects.

At block 304, semantic information and hierarchical metadata is generated for groups of objects. In various examples, the hierarchical metadata may include a particular scheme not for dividing the application into groups and elements. For example, each pages may have a number of forms with any number of elements such as inputs. The name of each of the forms and inputs may be saved, and the closest label for each of the inputs may be saved, among other semantic information. As one example, at the UI level, UI elements may have a type, such as an input or a drop-down, etc. The type may come from a fixed ontology of known types. UI elements may further have a description, which may be text such as a nearby label or placeholder text, or from an icon and interpretation of the icon, or metadata that is part of the HTML. At the group level, semantic information may include hierarchical relationship information such as roles of elements within groups, such as a menu in a menu list, or an input or form within a form. In various examples, elements may include labels, inputs, checkboxes, buttons, etc. In some examples, a semantic analysis of groups and elements can leverage the existence of tags, such as micro-tags, that add semantics to web elements.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4A:
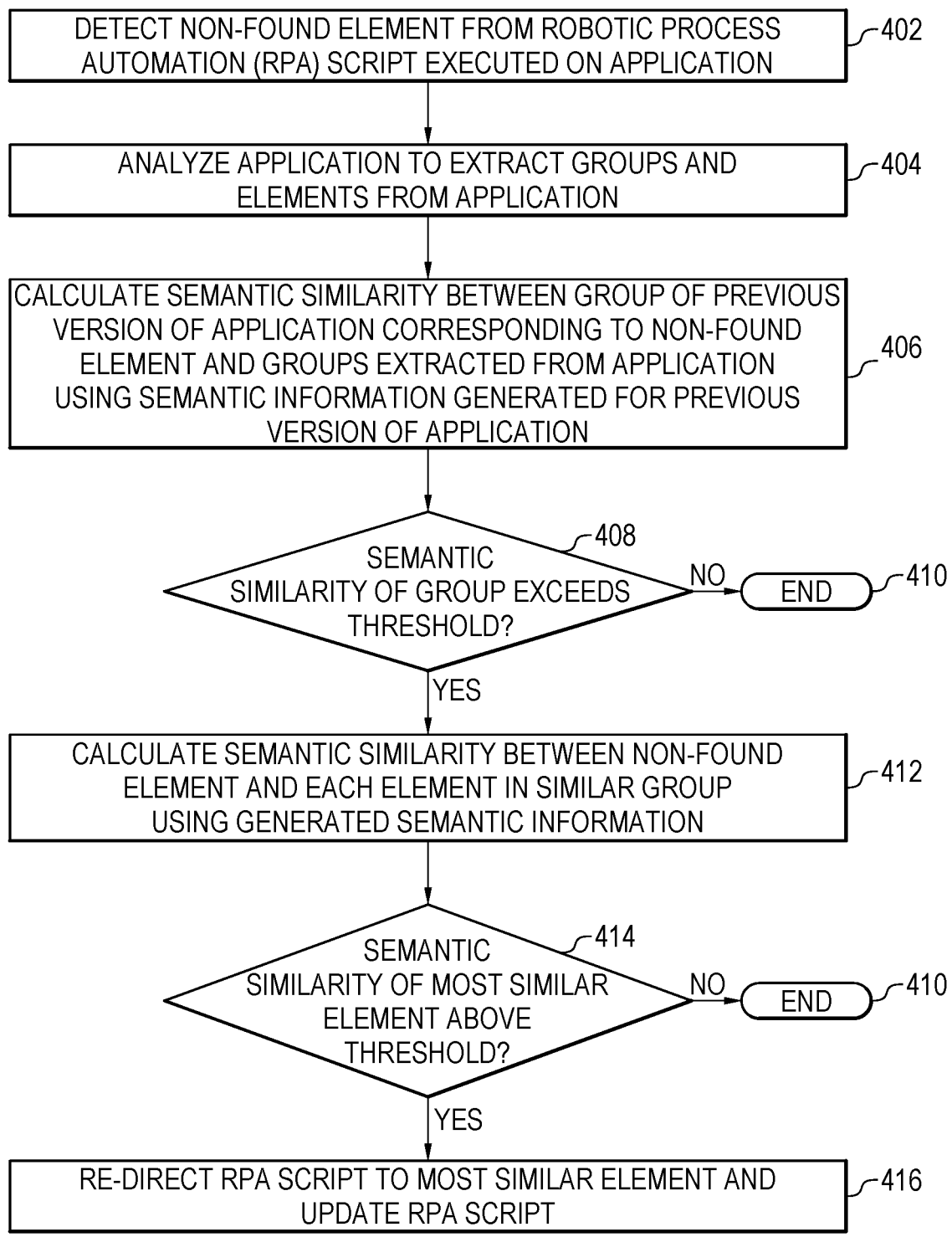
FIG. 4A is a process flow diagram of an example method that can automatically execute a resilient RPA using generated semantic information.

FIG. 4A is a process flow diagram of an example method that can automatically execute a resilient RPA using generated semantic information. The method 400A can be implemented with any suitable computing device, such as the computer 101 of FIG. 1. For example, the methods described below can be implemented by the processor set 110 of FIG. 1.

At block 402, a non-found element is detected from a robotic process automation (RPA) script executed on an application. For example, the application may be a web application. In some examples, the application may be a program to run, with object references using windows and controls. In some examples, the non-found element may be an input into the web application.

At block 404, the application is analyzed to extract groups and elements from the application. For example, the application may be divided into groups and elements according to the same scheme used during recording time in method 300 of FIG. 3. In various examples, the groups may be visual groups or structural groups. For example, visual groups may contain bounding box surrounding elements. Structural groups may be, for example, a document object model (DOM) tree relationship. In the case of a web application, the groups may be pages or forms. In some embodiments, a group may be a predefined default group. For example, when there is no natural group detected, then a default group may be assigned to a page. As one example, the page may include input fields without a form. In some examples, the groups may include non-form elements such as div tags that defines a division or a section in an HTML document. In some examples, the groups may be hierarchical. For example, a group may be a parent with one or more children, which may each also include one or more children. In some examples, the groups may be nested groups. For example, a group hierarchy may not be a simple parent child relationship, but may include an arbitrary number of group hierarchies. As one example, an element may be located in a form in another form, or a form may be located in a div in another div. In various examples, the elements may be inputs, such as HTML inputs. In some examples, the elements may be tags. For example, menus are typically implemented with <li> or <ul> or <a> tags. In some examples, the elements may be micro-tags. For example, micro-tags may include microdata that includes additional tags added to HTML of pages. For example, micro-tags may include an itemscope micro-tag to specify that HTML included in a particular block is about a particular item, an itemtype micro-tag that specifies that an item is of a particular type, an itemprop micro-tag that specifies additional properties of an item.

At block 406, a semantic similarity is calculated between the extracted groups and a previously extracted group from a previous version of the application. For example, the semantic similarity may be calculated using semantic information generated for the previous version of the application. As one example, the names of the groups may be compared to calculate the semantic similarity. For example, the semantic similarity may be calculated using a cosine similarity function.

At decision diamond 408, a determination is made as to whether the semantic similarity of the group exceeds a threshold. For example, the threshold may be a similarity threshold. Alternatively, if a similarity distance metric is used, then a determination may be made as to whether the distance threshold is not exceeded. If a similarity threshold is not exceeded, then the method proceeds to block 410. If a similarity threshold is exceeded, then the group is detected as being similar to the previously extracted group and the method proceeds to block 412.

At block 410, the method ends. For example, the RPA process may not be able to be self-healed if a similar groups is not detectable, or a similar element is not detectable.

At block 412, a semantic similarity between each of the extracted set of elements in the similar group and the non-found element is calculated using the generated semantic information. For example, a semantic similarity score may be generated using a cosine similarity function between the name of the non-found element and the names of each of the elements in the similar group.

At decision diamond 414, a determination is made as to whether the semantic similarity of the most similar element is above a threshold. For example, the threshold may be a similarity threshold. Alternatively, if a similarity distance metric is used, then a determination may be made as to whether the distance threshold is not exceeded by the least dissimilar element.

At block 416, the RPA script is re-directed to the most similar element. The RPA script is then updated. For example, the RPA script may be updated to use the most similar element instead of the non-found element in subsequent executions.

The process flow diagram of FIG. 4A is not intended to indicate that the operations of the method 400A are to be executed in any particular order, or that all of the operations of the method 400A are to be included in every case. Additionally, the method 400A can include any suitable number of additional operations. For example, while method 400A is exemplified in detail for the case of forms and immediate inputs of the form, the method 400A can be extended to cover non-web applications, other notions of groups, other techniques of object reference, and other types of RPA technologies, such as surface automation.

Figure 4B:
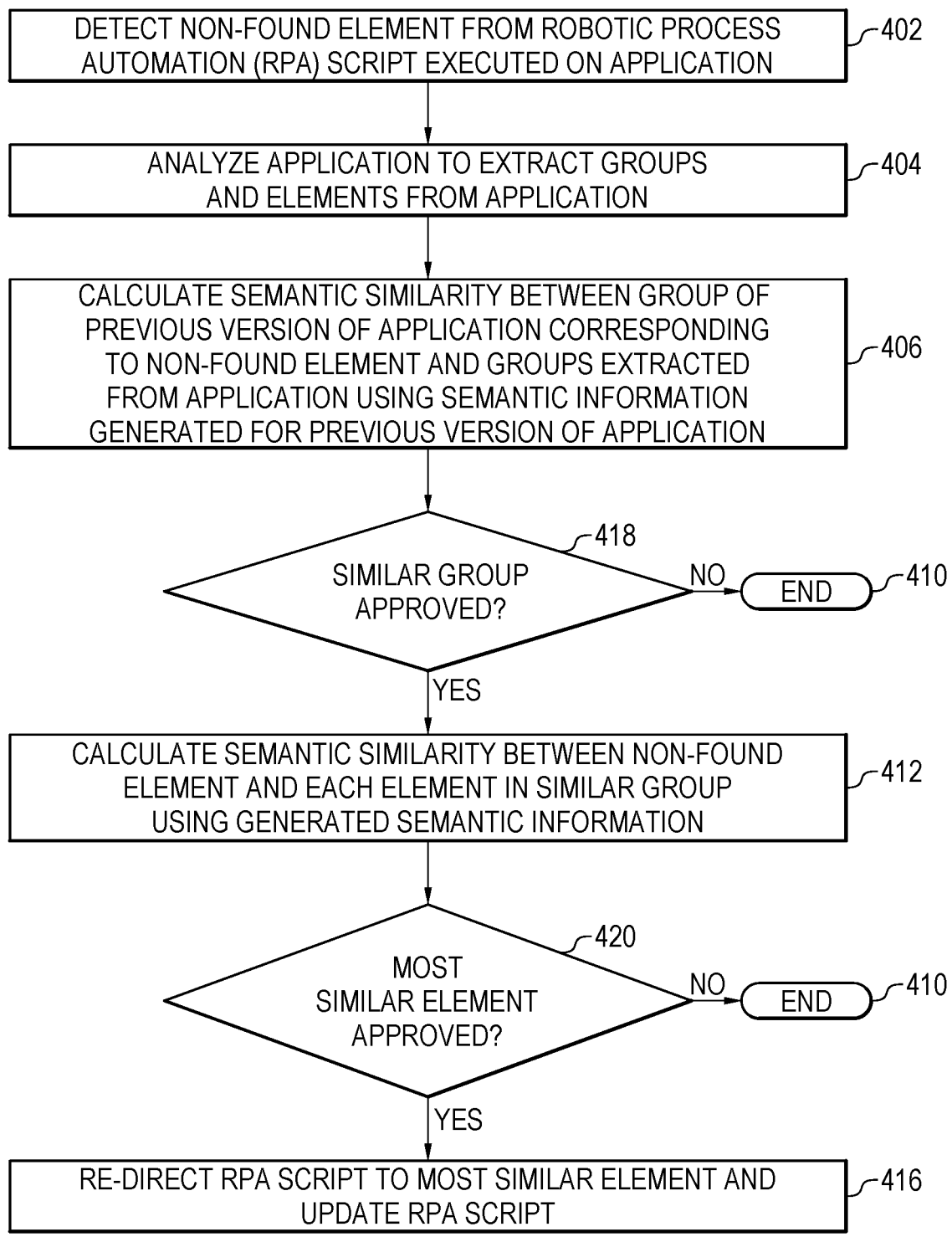
FIG. 4B is a process flow diagram of an example method that can semi-automatically execute a resilient RPA using generated semantic information.

FIG. 4B is a process flow diagram of an example method that can semi-automatically execute a resilient RPA using generated semantic information. The method 400B can be implemented with any suitable computing device, such as the computer 101 of FIG. 1. For example, the methods described below can be implemented by the processor set 110 of FIG. 1.

The method 400B includes similarly referenced elements from FIG. 4A. In addition, at decision diamond 418, a determination is made as to whether a similar group is approved. For example, in some instances, the semantic similarity of a most similar group to a group corresponding to a non-found element may not exceed a similarity threshold, but may still be within a range of the similarity threshold. In various examples, the similar group may be sent for review and approval. For example, a subject matter expert (SME) may approve the similar group as an acceptable replacement for the extracted group from the previous version of the application.

At block 420, a determination is similarly made as to whether the most similar element is approved. For example, in some instances, the semantic similarity of a most similar element of a similar group corresponding to a non-found element may not exceed a similarity threshold, but may still be within a range of the similarity threshold. In various examples, the most similar element may similarly be sent for review and approval. An SME may approve the similar element as an acceptable replacement for the non-found element in the current version of the application.

The process flow diagram of FIG. 4B is not intended to indicate that the operations of the method 400B are to be executed in any particular order, or that all of the operations of the method 400B are to be included in every case. Additionally, the method 400B can include any suitable number of additional operations.

Figure 5:
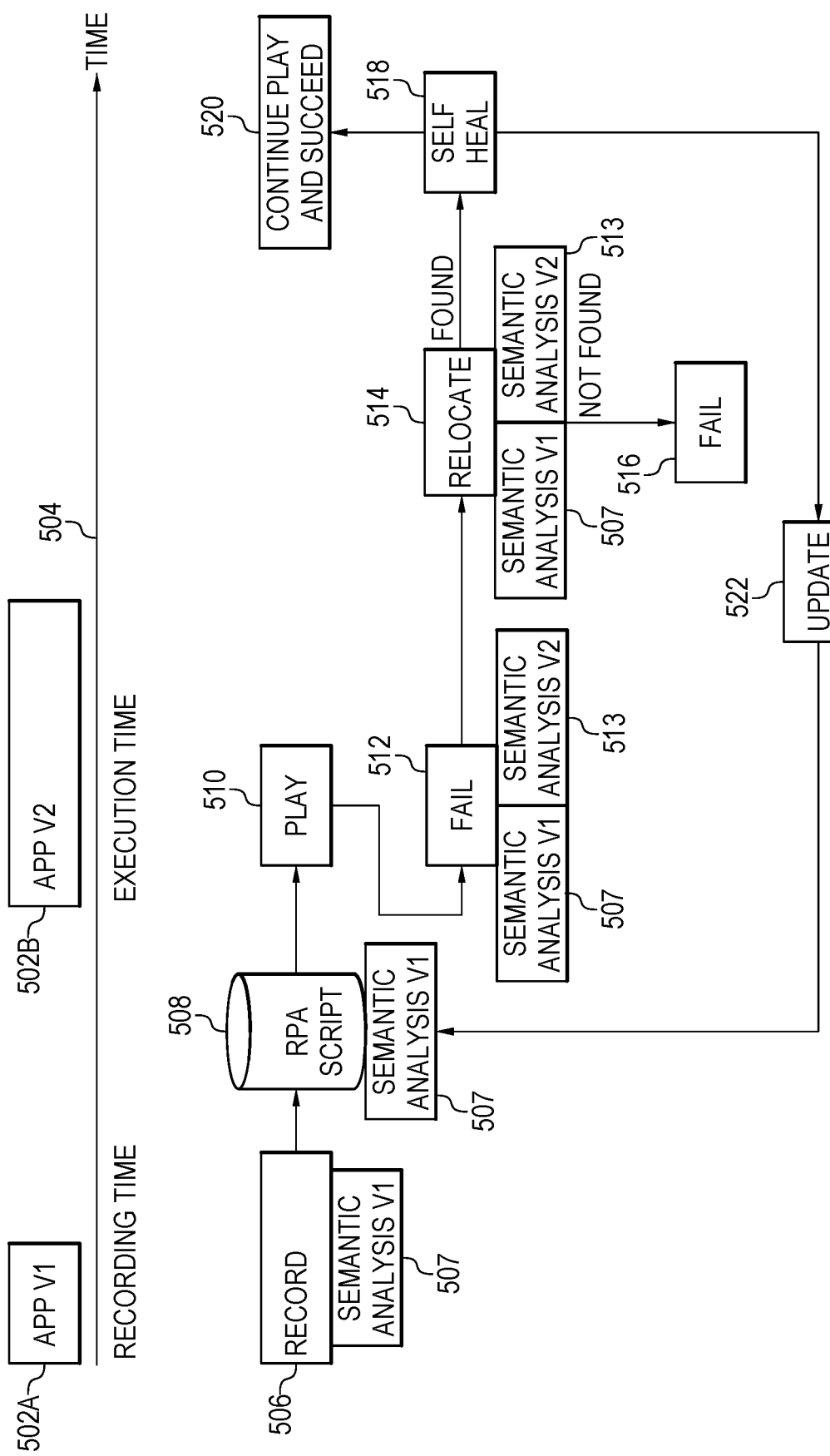
FIG. 5 is a schematic diagram of an example system for automatically generating semantic information and automatically executing a resilient RPA using generated semantic information.

With reference now to FIG. 5, a schematic diagram shows an example system for automatically generating semantic information and automatically executing a resilient RPA using generated semantic information. The example system 500 of FIG. 5 includes two versions of an application, including version one 502A and version two 502B. A timeline 504 indicates elements of the two stages of recording time and execution time. The embodiments herein may thus be applied to two main stages of the RPA lifecycle: recording time and execution time, as shown on timeline 504.

At block 506, the system 500 records user actions on the first version 502A. In various embodiments, the system 500 may perform two stages of semantic analysis that includes an analysis of groups and elements in the application.

At block 507, a first stage of semantic analysis is performed during the recording of the actions of the user. In various examples, the first stage of semantic analysis may analyze groups and elements of each groups in the first version 502A of the application and collect additional semantic understanding of each page of app v1 502A. For example, in response to detecting a that an input is selected by the user, the processor computes meta-data for the input including the input name, the input selector, and input nearest label. The processor can also compute semantic group data for the group in which the input is located, such as a form. For example, the semantic group data for a form may include the form nearest title, the form list of inputs names, the form's buttons. In various examples, the system 500 then stores the additional semantic information and meta-data within the RPA script 508. As one example, this data may be saved as an object denoted by app.version.page.form.input or app-url.v1.form1.input1. This saved data may later be used by the system 500 for self-healing, as described below.

At execution time, at block 510, the system 500 plays or executes the RPA script 508. In various examples, in response to detecting that the RPA script 508 has failed 512, another semantic analysis is performed. For example, in response to detecting that the script fails 512 to find an element in the second version 502B of the application, the system 500 can apply a semantic understanding also on the new page of the second version 502B of the application. For example, in response to detecting that the RPA script 508 failed due to a selector not being found, the system 500 may retrieve the corresponding v1.input1 object and the current URL where the RPA bot failed.

At block 514, the system can then use a two-stage semantic analysis algorithm to relocate the unfound element to the most semantically similar element. For example, a first stage of the two-stage algorithm may include finding most similar semantic group. A second stage of the two-stage algorithm includes finding the most similar element in the most similar semantic group. To continue the above example, at playing time, in response to detecting that an RPA bot failed due to a selector not being found, the system 500 retrieves the corresponding v1.input1 object and the current URL where the RPA bot failed. The system 500 then processes the new version 502B of the HTML app and extracts all the N number of forms in version 502B, which may be denoted as url.v2.form 1, . . . , url.v2.formN. For example, the forms may be extracted using textual parsing or any suitable computer vision techniques. The system 500 can then compute the semantic similarity between form v1.form1 and the forms v2.form1, . . . , v2.formN. For example, the semantic similarity can be executed using the cosine similarity between the two embedding vectors of the two forms titles. The system 500 can then identify a most similar form to form v1.form1. For the most similar form, denoted by v2.formMostSim, if the similarity is less than a minimum threshold, then the system 500 may exit the two-stage semantic analysis. For example, if similarity (v1.form1, v2.formMostSim)<MIN_THRESHOLD, then EXIT. Alternatively, a similarity distance may be used. For example, if similarity_distance (v1.form1, v2.formMostSim)>MIN_THRESHOLD, then EXIT. In response to detecting that the similarity exceeds the threshold, or the similarity distance is less than the minimum threshold, then the system 500 can compute the semantic similarity between each input in v2.formMostSim and the not-found input v1.form1.input-not-found. For example, the system 500 can execute the semantic similarity by using the cosine similarity between the two embedding vectors of the two input names. In various examples, if the similarity distance (v1.form1.input1, v2.formMostSim.inputMostSim)>MIN_THRESHOLD then the system 500 can exit the two-stage semantic analysis. Alternatively, the system 500 may exit the two-stage semantic analysis in response to detecting that similarity (v1.form1.input1, v2.formMostSim.inputMostSim)<MIN_THRESHOLD.

At block 518, in response to detecting that the similarities are above some threshold, the system 500 can then perform a self-healing and return the new element. For example, the system 500 can use v2.formMostSim.inpuMostSim instead of v1.form1.input-not-found.

At block 520, the system 500 can continue the RPA script at block 520. For example, the RPA script may use v2.formMostSim.inpuMostSim to overcome the not found selector error.

At block 522, the system can also update the script repository so future executions will not fail. For example, the new name and location of the missing old element may be replaced with the name and location of the new element. Again, to continue the example, v2.formMostSim.inpuMostSim may replace v1.form1.input-not-found in the script repository.

It is to be understood that the block diagram of FIG. 5 is not intended to indicate that the system 500 is to include all of the components shown in FIG. 5. Rather, the system 500 can include fewer or additional components not illustrated in FIG. 5 (e.g., additional application versions, or additional RPA scripts, self-healings, updates, etc.). In various examples, although a fully automatic process is described in FIG. 5 similar to method 400A of FIG. 4A, in some embodiments, a semi-automatic process may alternatively be used as described in method 400B of FIG. 4B. For example, the system 500 can be fully autonomous and therefore not require any input from an RPA developer, such as for example, selecting anchor-base objects. However, if the similarity is within a small range below MIN_THRESHOLD, then the system 500 can also prompt for feedback from a subject matter expert (SME) on the validity of applying the fix automatically. This may also be referred herein to as a human-in-the-loop embodiment.

FIG. 6A is an example first version of an HTML page that may have semantic information extracted via a semantic analysis performed at a recording time. The HTML page 600A includes a single form 602A that includes various input fields 604. For example, HTML page 600A may be a Version 1 (V1) of a page including one form, titled: Add new employee details.

FIG. 6A shows an example embodiment in the web apps domain where an application includes the form 602A plays the role of a group, and the inputs 604 in the form represent elements. At record time, when the RPA developer interacts with inputs 604, a processor computes semantic information for forms (groups) and inputs (elements). For example, for the inputs 604 of form 602A, the processor can compute semantic information, its metadata and its immediate containing form. As one example, the semantic information for inputs 604 may include nearest input label. For each of any detected groups such as form 602A, the processor can save semantic information, its metadata and immediate children. For example, the semantic information may be the form title. In the example of FIG. 6B, the particular "select item" pull-down menu type input 606 may be detected as related to the label "role in company" and part of the group "add new employee details".

FIG. 6B is an example updated version 600B of an HTML page that may have a resilient RPA applied at execution using semantic information extracted from the first version. The updated version 602B includes similarly referenced elements of FIG. 6A. However, the pull-down menu 606 has now changed location and is no longer under the "role in company" label nor part of an "add new employee details" group. Rather, the updated version 600B includes two new forms 602B and 602C, labeled "employee details" and "request employee removal for IT", respectively. The pull-down menu input 606 is now part of the new form 602B.

Thus, the example HTML pages 600A and 600B are used one example to demonstrate the types of resiliency issues addressed by embodiments described herein. In FIGS. 6A and 6B, two versions of an HTML page are shown in HTML pages 600A and 600B. In the example HTML page 600B, version 2 (V2) includes two forms, including a first form 602B titled "Employee details", and a second form 602C titled "Request Employee removal for IT", respectively. In addition, in the example HTML page 600B, there are many changes inside each of the forms 602B and 602C. For example, the name of the input 604 "Role in company" of form 602A in FIG. 6A changed to "Job description" in form 602B of FIG. 6B and its location on the form has also changed from under the "city" input 604 to underneath first name field input 604.

In one example, an RPA bot may have been built to automatically fill this form. Furthermore, the developers may have changed the underlying metadata of the elements. Therefore, strict selectors such as Xpath may not able to find the input 606 element again. In this example, an RPA bot may also not able to find the INPUT "username" since its label changed. Moreover, the RPA bot may also not be able to find the desired form since its title was changed. Thus, selectors, fuzzy selectors, and simple syntactic text analysis may also similarly fail. For example, the RPA bot may not understand that "Role in company" and "Job title" are closely related. Therefore, the embodiments described herein may be used to execute a self-healing that enables for RPA bots in this examples. Moreover, in various other examples, there may be many more types of resiliency issues that stem not from the application evaluation, but from having a different runtime in which the script was recorded versus executed. For example, this may include resiliency issues due to screen resolution change, locale change, etc.

Thus, in various embodiments, at running time, when the RPA bot fails to select the input, the embodiments described herein may be used to process the new html page 600B and extract all the semantic group elements. For example, a processor may detect all the forms 602B and 602C in the page 600B. Thereafter, the processor attempts to relocate the input element that is semantically close by applying a 2 stage-approach that combines semantic similarity at the group level and the element level. For example, at the first level, the processor calculates the semantic group similarity. For example, the processor can calculate the semantic group similarity using a cosine similarity function based on sentence encoding between the old form title and the titles of the current forms. The processor can then select the most similar form if the semantic distance is below a certain threshold. For example, the processor may detect that the "employee details" form 602B is the most similar to form 602A and that the distance is also below a threshold. In various examples, if the processor detects that the distance is not below the threshold, then the processor cannot heal the RPA bot and exits the self-healing process.

In the second stage, if the first stage is successful, then the processor calculates the semantic element similarity between the non-found input and each of every input in the form or other group that was retrieved in the first stage. For example, the semantic similarity can be calculated by the cosine similarity between the embedding on the inputs name and reflects the semantic distance between the two names. If the similarity score of the most similar input is above a certain threshold, then this input is chosen and the RPA bot is re-directed to the new input. For example, "Role in company" may be the most similar input.

Figure 7:
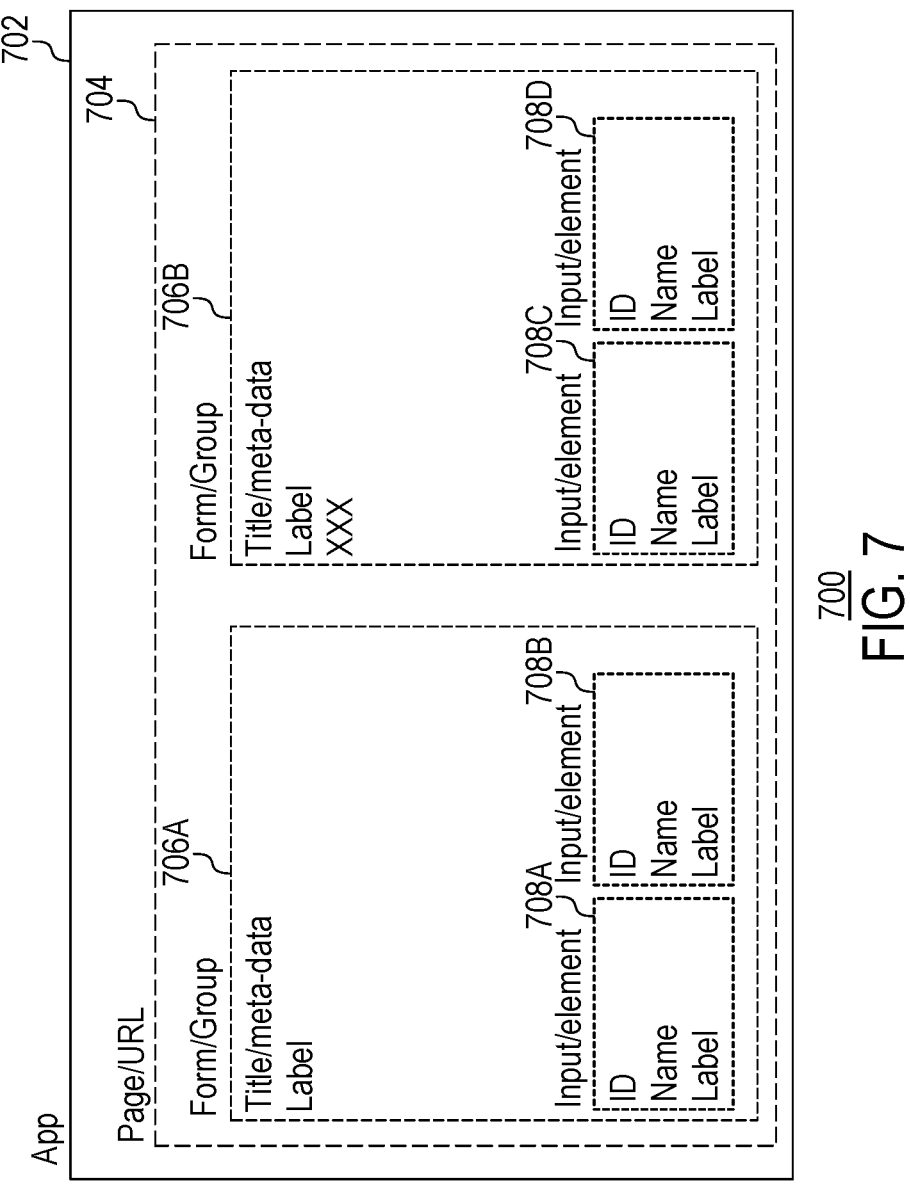
FIG. 7 is a block diagram of an example web hierarchy.

FIG. 7 is a block diagram of an example web hierarchy. The example web hierarchy 700 include an application level 702, a page/URL level 704, a form/group level including forms/groups 706A and 706B. The web hierarchy 700 includes a top level corresponding to a web application (app) 702. The web application 702 includes a lower level that includes a page/URL 704. The page/URL 704 includes a lower level including forms/groups 706A and 706B. The form/group 706A includes input/element 708A and input/element 708B. The form/group 706B includes input/element 708C and input/element 708D. In addition, each of the forms/groups 706A and 706B includes a title, meta-data, and a label.

It is to be understood that the block diagram of FIG. 7 is not intended to indicate that the web hierarchy 700 is to include all of the components shown in FIG. 7. Rather, the web hierarchy 700 can include fewer or additional components not illustrated in FIG. 7 (e.g., additional levels of hierarchy, types of groups, forms, types of element, inputs, or additional names, labels, etc.). In various examples, the groups may be visual groups or structural groups. In some examples, a page may include input fields without a form. In some examples, the groups may include non-form elements such as div tags that defines a division or a section in an HTML document. In some examples, the groups may be hierarchical. In some examples, the groups may be nested groups. In some examples, the elements may be tags. For example, micro-tags may include microdata that includes additional tags added to HTML of pages.

Figure 8:
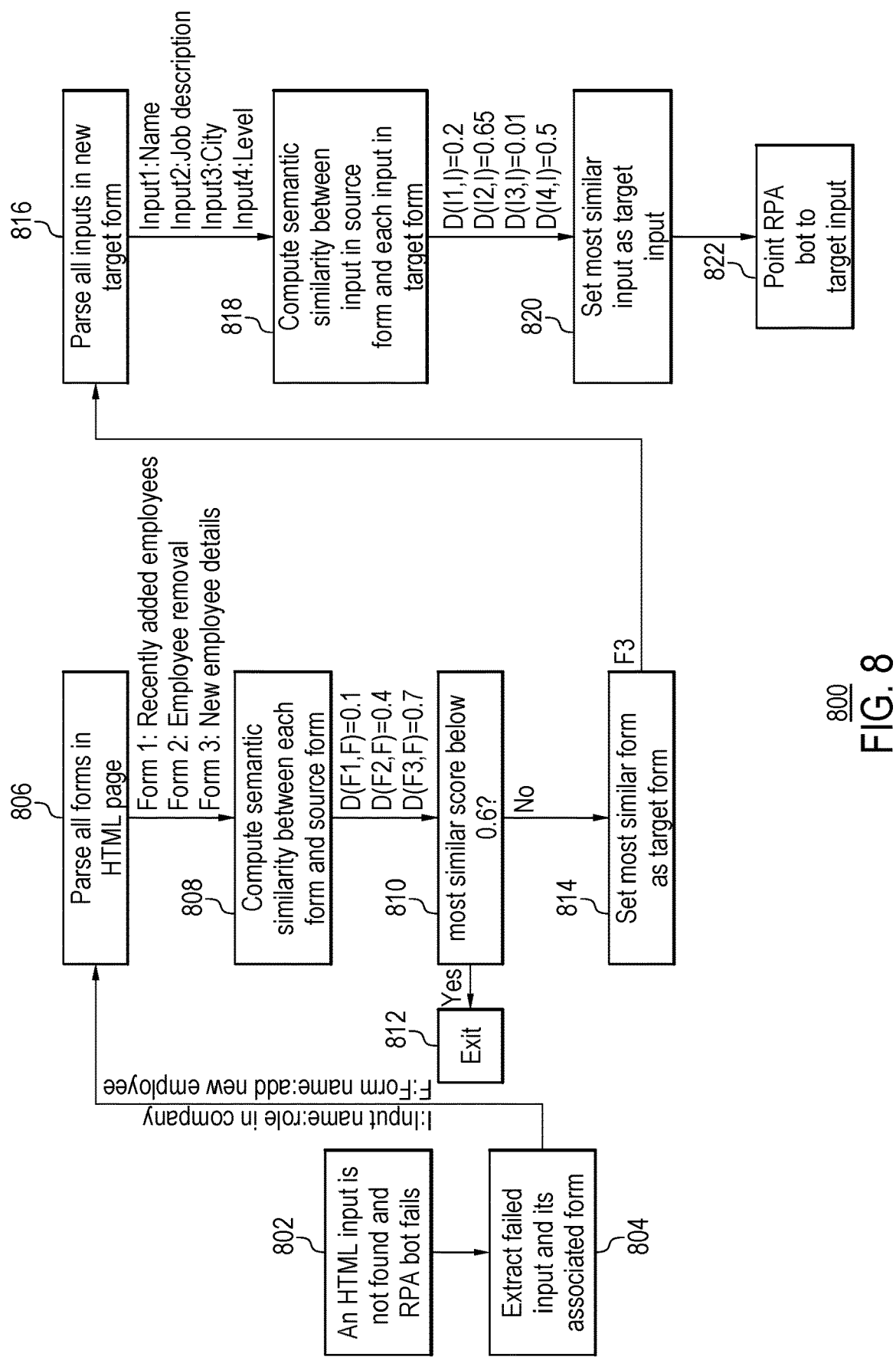
FIG. 8 is a process flow diagram of an example RPA process at execution time, according to embodiments described herein.

FIG. 8 is a process flow diagram of an example RPA process 800 at execution time, according to embodiments described herein. The RPA process 800 can be implemented with any suitable computing device, such as the computer 101 of FIG. 1. For example, the methods described below can be implemented by the processor set 110 of FIG. 1. The example RPA process 800 of FIG. 8 is being executed for an HTML page of a web application.

At block 802, an HTML input is not found, and the RPA bot fails. For example, a selector may have not been found by the RPA bot in a page of an updated version of the web application.

At block 804, failed input is extracted along with its associated form. For example, the name of the input may be "role in company" and the name of the form may be "add new employee".

At block 806, all forms in the current HTML page are parsed. For example, detected forms in the HTML page may include a first form named "recently added employees", a second form named "employee removal", and a third form named "new employee details". Alternatively, in some embodiments, computer vision may be used to extract elements from the forms.

At block 808, a semantic similarity is computed between each form and the source form. In various examples, the semantic similarity may be computed using a cosine similarity function resulting in a value between 0 and 1. As shown in the example of FIG. 8, the values may be D(F1, F)=0.1, D(F2, F)=0.4, and D(F3, F)=0.7.

At block 810, a most similar score is identified from the scores for the forms, and compared with a threshold to determine whether the score exceeds a distance threshold or does not exceed a similarity threshold. For example, the similarity threshold may be a similarity score of 0.6. If the score does not exceed the similarity threshold, then the process 800 may continue at block 812. If the highest similarity score does exceed the similarity threshold, then the process 800 may proceed at block 814. In the example of FIG. 8, the score of 0.7 corresponding to D(F3, F) exceeds the threshold of 0.6, and therefore the process may continue to block 814.

At block 812, the process 800 is exited. For example, a self-healing may not be possible in all cases, particularly where no similar group or form is discoverable.

At block 814, the most similar form is set as a target form. In the example of FIG. 8, form 3 with the title "new employee details" may be set as the target form.

At block 816, the target form are parsed to extract all inputs. For example, the inputs of form 3 may include input1 with the input name "name", input2 with the input name "job description", input3 with the input name "city", and input4 with the input name "level".

At block 818, a semantic similarity is computed between the input in the source form and each input in the target form. For example, the semantic similarity may be computed between the input "role in company" and the inputs from block 816 using a cosine similarity score. In the example of FIG. 8, the resulting values are: D(I1, I)=0.2, D(I2, I)=0.65, D(I3, I)=0.01, and D(I4, I)=0.5, where I represents the failed input, and I1, I2, I3, and I4 represent the four extracted inputs from block 816.

At block 820, the most similar input is set as a target input. For example, the input D(I2, I)=0.65 has the highest similarity score, and therefore input2 may be chosen as the target input.

At block 822, the RPA bot is pointed to the target input. Thus, the RPA bot may be pointed to the "job description" input instead of looking for the original "role in company" input.

The process flow diagram of FIG. 8 is not intended to indicate that the operations of the RPA process 800 are to be executed in any particular order, or that all of the operations of the method 800 are to be included in every case. Additionally, the RPA process 800 can include any suitable number of additional operations. For example, an additional similarity or similarity distance threshold may be included at block 818, and the RPA process 800 may continue at block 812 from block 818 if none of the similarity scores between the inputs exceed the similarity threshold, or do not exceed the similarity distance threshold.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   detect a non-found element from a robotic process automation (RPA) script executed on an application;
   analyze the application to extract a group and a set of elements from the application;
   calculate a first semantic similarity between the extracted group and a previously extracted group from a previous version of the application;
   calculate, in response to detecting that the extracted group is similar to the previously extracted group, a second semantic similarity between the extracted set of elements and the non-found element; and
   re-direct the RPA script to use a most similar element of the extracted set of elements.

2. The system of claim 1, wherein the group comprises a visual group.

3. The system of claim 1, wherein the group comprises a structural group.

4. The system of claim 1, wherein the group comprises a predefined default group.

5. The system of claim 1, wherein the group comprises a non-form element.

6. The system of claim 1, wherein the group is hierarchical.

7. The system of claim 1, wherein the group is part of a hierarchy of groups that is nested.

8. The system of claim 1, wherein the non-found element comprises an input.

9. The system of claim 1, wherein the non-found element comprises a tag.

10. The system of claim 1, wherein the non-found element comprises a micro-tag.

11. The system of claim 1, wherein the application comprises a web application.

12. The system of claim 1, wherein the application comprises a program to run, and object references using windows and controls.

13. A computer-implemented method, comprising:
- detecting, via a processor, a non-found element from a robotic process automation (RPA) script executed on an application;
- analyzing, via the processor, the application to extract a group and a set of elements from the application;
- calculating, via the processor, a first semantic similarity between the extracted group and a previously extracted group from a previous version of the application;
- calculating, via the processor, in response to detecting that the extracted group is similar to the previously extracted group, a second semantic similarity between the extracted set of elements and the non-found element; and
- re-directing, via the processor, the RPA script to use a most similar element of the extracted set of elements.

14. The computer-implemented method of claim 13, further comprising using computer vision techniques to identify and extract the group and the set of elements.

15. The computer-implemented method of claim 13, wherein calculating the first semantic similarity and the second semantic similarity comprises calculating a cosine similarity score.

16. The computer-implemented method of claim 13, wherein calculating that the extracted group is similar to the previously extracted group, and calculating that the extracted set of elements and the non-found element are similar, comprise determining that the first semantic similarity and the second semantic similarity exceed a similarity threshold.

17. The computer-implemented method of claim 13, wherein calculating that the extracted group is similar to the previously extracted group comprises sending the first semantic similarity for review in response to detecting that the first semantic similarity does not exceed a similarity threshold and is within a range of the similarity threshold, and receiving an approval that the extracted group and the previously extracted group are similar.

18. The computer-implemented method of claim 13, wherein analyzing the application comprises extracting a plurality of groups from the application, further comprising calculating the first semantic similarity between the extracted group and the previously extracted group from the previous version of the application, and selecting a most similar group with a higher semantic similarity as a target group.

19. The computer-implemented method of claim 13, comprising generating, via the processor, semantic information for the previous version of the application at a recording time of the RPA script.

20. The computer-implemented method of claim 13, comprising updating the RPA script with the most similar element.

21. A computer program product for robotic process automation, the computer program product comprising a computer-readable storage medium having program code embodied therewith, the program code executable by a processor to cause the processor to:
- detect a non-found element from a robotic process automation (RPA) script executed on an application;
- analyze the application to extract a group and a set of elements from the application;
- calculate a first semantic similarity between the extracted group and a previously extracted group from a previous version of the application;
- calculate, in response to detecting that the extracted group is similar to the previously extracted group, a second semantic similarity between the extracted set of elements and the non-found element; and
- re-direct the RPA script to use a most similar element of the extracted set of elements.

22. The computer program product of claim 21, further comprising program code executable by the processor to calculate a cosine similarity score.

23. The computer program product of claim 21, further comprising program code executable by the processor to detect that the first semantic similarity between the extracted group and the previously extracted group, and the second semantic similarity between the extracted set of elements and the non-found element, exceed a similarity threshold.

24. The computer program product of claim 21, further comprising program code executable by the processor to extract a plurality of groups from the application, calculate the first semantic similarity between the extracted group and the previously extracted group from the previous version of the application, and select a most similar group with a higher semantic similarity as a target group.

25. The computer program product of claim 21, further comprising program code executable by the processor to generate semantic information for the previous version of the application at a recording time of the RPA script.

* * * * *